Jan. 15, 1957   O. VIELMO   2,777,741
DEVICE FOR PROVIDING A SLIDABLE SEAL
BETWEEN A PISTON AND CYLINDER
Filed June 22, 1954

INVENTOR:
OSKAR VIELMO
BY:

United States Patent Office 2,777,741
Patented Jan. 15, 1957

2,777,741

DEVICE FOR PROVIDING A SLIDABLE SEAL BETWEEN A PISTON AND CYLINDER

Oskar Vielmo, Stuttgart-Mohringen, Germany, assignor to Robert Bosch G. m. b. H. Stuttgart, Stuttgart, Germany Application June 22, 1954, Serial No. 438,510

Claims priority, application Germany June 22, 1953

8 Claims. (Cl. 309—33)

The present invention relates to devices for providing a slidable sealing engagement between pistons and cylinders, particularly pistons and cylinders which are used in damping devices or for braking purposes.

With known devices of this type, annular resilient sealing members are placed on the pistons, but these sealing members must invariably be provided with an original diameter smaller than that of the pistons and must then be stretched over the pistons to provide the proper connection between sealing member and pistons. As a result the known annular sealing members are very difficult to assemble with the pistons and to remove therefrom when it is necessary to replace a worn sealing member, and moreover, because of the stretching to which the sealing members are subject, they require a large amount of rubber or other material from which they are made.

One of the objects of the present invention is to overcome the above drawbacks by providing a sealing device which need not be stretched over a piston in order to be attached thereto so that the device of the invention is not under great tension while being used.

Another object of the invention is to provide a sealing member which requires far less rubber or the like than known sealing members.

A further object of the present invention is to provide a sealing member which may be easily attached to and removed from a piston.

An additional object of the present invention is to provide an exceedingly simple and inexpensive process for manufacturing a part of the device of the invention.

It is still another object of the present invention to provide a sealing member which, while being of an exceedingly simple construction and capable of accomplishing all of the above objects, is at the same time very reliable in operation and has a long life.

With the above objects in view the present invention mainly comprises a device for providing a slidable sealed engagement between a piston and a cylinder, this device including a sheet metal member having an annular cylindrical portion and at one end of this cylindrical portion, an inwardly directed annular flange, this sheet metal member being adapted to be placed on the piston with the inner face of the flange thereof engaging the front end of the piston and with the inner face of the cylindrical portion engaging the outer face of the piston. An annular sealing member is joined to the outer face of the sheet metal member at the flange thereof and extends from this flange along the outer surface of the sheet metal member toward but not up to the end of the sheet metal member distant from the flange to leave at the latter end of the sheet metal member a free cylindrical portion which may be bent inwardly for attaching the sheet metal member and the sealing member therewith to the piston.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanyings drawings, in which:

Figure 1:
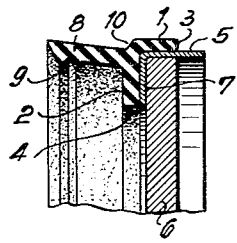
Fig. 1 is a partly sectional fragmentary view of a device of the invention before it is fully mounted on the piston.
Figure 2:
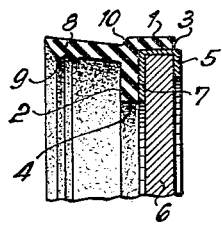
Fig. 2 shows the structure of Fig. 1 when it is fully mounted on a piston.

Referring now to the drawings, and in particular to Figs. 1–5, it will be seen that the device of the invention includes an annular sealing member having a cylindrical portion 1 whose outer surface is adapted to slide along the inner surface of a cylinder and having an inwardly directed annular portion 2 making substantially a right angle with the portion 1. According to the embodiment of Figs. 1 and 2 the parts 1 and 2 of the sealing member terminate in end faces 3 and 4 which respectively form right angles with the surface of portions 1 and 2 of the sealing member. The portions 1 and 2 are formed in one piece from a synthetic rubber in an assembly producing only a very small friction. The portion 1, 2 of the annular sealing member is vulcanized to an annular sheet metal member having a cylindrical portion 5 and having at one end an inwardly directed annular flange 7, the inwardly directed portion 2 of the sealing member being located against the outer face of flange 7 and the portion 1 of the sealing member extending from the flange 7 along the outer face of portion 5 toward but not up to the end of portion 5 distant from flange 7 to leave at this latter end a free part adapted to be bent inwardly, as shown in Fig. 2, for attaching the sheet metal member 5, 7 and the sealing member therewith to the piston 6. As is evident from Figs. 1 and 2 the inner face of flange 7 engages the front face of the piston 6 while the cylindrical portion 5 engages the outer cylindrical face of the piston 6 as well as the rear face thereof after being bent inwardly as shown in Fig. 2. The sheet metal member 5, 7 is made of a relatively thin sheet metal and is drawn or pressed to the shape shown, the inner face of cylindrical portion 5 preferably being located with a press fit against the outer cylindrical face of the piston 6. It will be noted that the end portion of part 5 of the sheet metal member which is not covered with the portion 1 of the sealing member extends beyond the piston 6 to be bent inwardly against the rear face thereof, as shown in Fig. 2, to provide without further steps a secure connection to the piston which is free from play and which provides a gas-tight seal between the sheet metal member and piston. Furthermore, it will be noted that in applying the device of the invention to the piston 6 it is unnecessary to stretch the sealing member 1, 2 so that this sealing member is not under tension and can be made of a minimum wall thickness.

The sealing member further includes a forwardly extending annular free portion 8 which extends forwardly from the portion 2 of the sealing member and which flares outwardly therefrom toward the inner surface of the cylinder wall which is not shown in the drawings. Adjacent its outer free end, the portion 8 of the sealing member is formed with an inner annular groove 9 adapted to receive an endless coil spring for urging the free peripheral portion of part 8 outwardly against the cylinder wall. It will be noted that the portion 8 of the sealing member forms with the cylindrical portion 1 thereof a shoulder 10 which is conical and which is located opposite the intersection between parts 5 and 7 of the sheet metal member, this shoulder providing at the outer face of the sealing member a space in which a lubricant may be located.

After the device has been in operation for a long period of time and requires changing, it is only necessary to bend the right end of the sheet metal member, as viewed in Fig. 2, back to the position of Fig. 1, or this end of the sheet metal member can simply be cut off. Then, the entire device can be removed from the piston without any further preparation. The piston itself remains unchanged and is ready to receive a new sealing device immediately after the worn one is removed.

Figure 3:
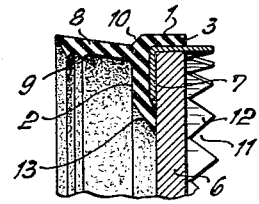
Fig. 3 shows a variation of the structure of Figs. 1 and 2 before it is fully mounted on the piston.

The removal of the sealing device from the piston and the inward bending of the free end of the sheet metal member when mounting the sealing device of the invention on a piston can be simplified by providing the free end of part 5 of the sheet metal member with inwardly extending slots or cutouts 11, as shown in Fig. 3. These cutouts form projections 12 which may be very easily bent and which, by suitable size and shape of the cutouts 11, can be bent against the rear face of the piston without any overlapping of the material located against the rear face of the piston.

Figure 4:
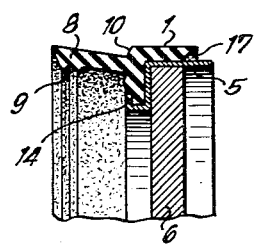
Fig. 4 shows a further variation of the structure of the invention.
Figure 5:
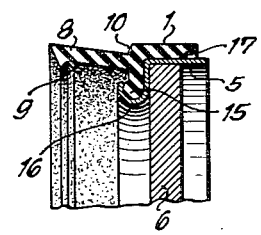
Fig. 5 shows yet another embodiment of the structure of the invention.

Instead of an end face 3 which makes a right angle with the cylindrical portion 1 of the sealing member, a conical face 17 can be provided, as shown in Figs. 4 and 5, this conical face 17 extending inwardly toward the sheet metal member from a sharp edge located at the right end of the resilient sealing member, as viewed in Figs. 4 and 5. In this way it is still possible to leave on the portion 5 of the sheet metal member a free end of sufficient length to be bent against the rear face of the piston and at the same time the portion 1 of the sealing member can be made longer than the portion 1 shown in Figs. 1–3 to provide a superior guide between the inner surface of the cylinder and the outer surface of the sealing member.

As is shown in Fig. 3, the portion 2 of the sealing member can extend radially inwardly beyond the flange 7 of the sheet metal member to provide a peripheral portion 13 on the sealing member which directly engages the front face of the piston to improve the sealing of the compression chamber ahead of the piston. It is further possible to improve the seal between the piston and sheet metal member 5, 7 by locating a paste between these members or by locating an annular resilient ring between these members.

As is shown in Fig. 4, the flange of the sheet metal member may be bent away from its inner face backwardly upon itself at its inner periphery to provide an annular channel 14 of substantially U-shaped cross section which is filled by the inner periphery of the portion 2 of the resilient sealing member 1, 2, so that in this way the stress on the joint through vulcanizing or the like between the inner periphery of portion 2 of the sealing member and the flange 7 is relieved. Furthermore, the sealing device is axially positioned in a more secure manner with the arrangement of Fig. 4. The sheet metal member can be provided with the channel 14 either before vulcanizing or after vulcanizing. Also, the channel 14 is so dimensioned that its free left wall, as viewed in Fig. 4 presses inwardly against the portion 2 of the sealing member, as is evident from Fig. 4.

The connection between the resilient sealing member 1, 2 and the sheet metal member 5, 7 can be further improved by providing at the inner periphery of portion 2 of the sealing member an enlarged annular part 15 of circular cross section. This part 15 is located within a channel 16 formed in the same way as channel 14 but having an arcuate cross section corresponding to the curvature of portion 15 of the sealing member. This arcuate annular channel 16 can be formed during manufacture of the sealing member or by rolling of the inner periphery of the sheet metal member. It is preferred to provide a sealing paste between the front face of the piston 6 and the channel 16 of the sheet metal member.

Figure 6:
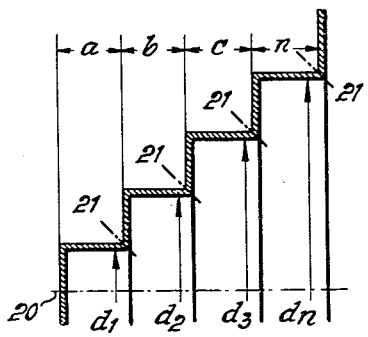
Fig. 6 illustrates the process for making part of the structure of the invention.
Figure 7:
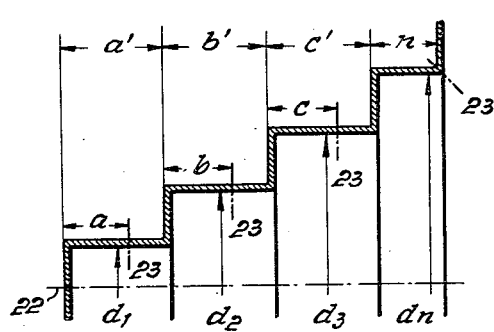
Fig. 7 illustrates a somewhat different embodiment of a process for making a part of the structure of the invention.

The above described sealing device lends itself particularly to mass production where the resilient sealing member 1, 2, 8 is manufactured by itself and where the annular sheet metal members are manufactured by forming an annular sheet metal piece into stepped cylindrical portions respectively having diameters $d_1$–$d_n$ respectively corresponding to the diameters of the pistons which are to carry the sealing device of the invention, the steps $a$, $b$, $c$–$n$ of sheet metal being pressed or drawn to the configuration shown in Fig. 6 and after an annular sheet metal member is formed having a wall whose cross section is shown in Fig. 6, the steps thereof can be cut or otherwise separated from each other along the lines 20 and 21 to provide sheet metal members to be used in the device of the invention. Thus, the height of the steps $a$–$n$ corresponds to the part 5 of the annular sheet metal member and the radial length of the inwardly directed flange 7 of the sheet metal member corresponds to the difference between the diameters $d_1$–$d_n$. The sheet metal members of Figs. 1–3 are manufactured according to this process. In order to provide sheet metal members which are adapted to have the inner peripheral channels 14 or 16 of Figs. 4 or 5, respectively, this same process may be used, but the height of the steps is increased to $a'$, $b'$, $c'$, etc., as shown in Fig. 7, and the steps are separated at lines 22 and 23 shown in Fig. 7 so as to provide cylindrical portions 5 of the same length as the process of Fig. 6 but at the same time giving all but the leftmost sheet metal member formed from the material of Fig. 6 a part at the inner periphery of the flange 7 which may be very easily bent backwardly to form either channel 14 or channel 16. With this process the sheet metal members may be manufactured with very little waste of material. Thus, for the entire sealing device of the invention very little sheet metal and very little rubber or other resilient material is required.

It will be understood that each of the elements described above, or two or more together, may also find a useful application in other types of sealing devices differing from the types described above.

While the invention has been illustrated and described as embodied in a device for providing slidable sealed engagement between a piston and cylinder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A device for providing a slidable sealed engagement between a piston and a cylinder, comprising, in combination, a sheet metal member having an annular cylindrical portion and at one end of said cylindrical portion an inwardly directed annular flange, said sheet metal member being adapted to be placed on a piston with the inner face of said flange engaging the front face of the piston and with the inner face of said cylindrical portion adapted to engage the outer cylindrical face of the piston; and an annular sealing member joined to the outer face of said sheet metal member at said flange thereof and extending from said flange along the outer surface of said sheet metal member toward but not up to the free end of said cylindrical portion of said sheet metal member to leave at said latter end of said sheet metal member a free cylindrical portion which may be bent inwardly for attaching said sheet metal member and said sealing member therewith to the piston.

2. A device for providing a slidable sealed engagement between a piston and a cylinder, comprising, in combination, a sheet metal member having an annular cylindrical portion and at one end of said cylindrical portion an inwardly directed annular flange, said sheet metal member being adapted to be placed on a piston with the inner face of said flange engaging the front face of the piston and with the inner face of said cylindrical portion adapted to engage the outer cylindrical face of the piston, said sheet metal member being formed with cutouts extending into said cylindrical portion thereof from the end of said cylindrical portion distant from said flange; and an annular sealing member having an inwardly directed annular portion joined to the outer face of said flange of said sheet metal member and having a cylindrical portion shorter than said cylindrical portion of said sheet metal member and extending from said annular flange along said cylindrical portion of said sheet metal member almost up to said cutouts thereof to leave on the sheet metal member a free portion formed with said cutouts and adapted to be bent inwardly for attaching said sheet metal member and said sealing member therewith to the piston.

3. A device for providing a slidable sealed engagement between a piston and a cylinder, comprising, in combination, a sheet metal member having an annular cylindrical portion and at one end of said cylindrical portion an inwardly directed annular flange, said sheet metal member being adapted to be placed on a piston with the inner face of said flange engaging the front face of the piston and with the inner face of said cylindrical portion adapted to engage the outer cylindrical face of the piston, said annular flange being curved away from the inner face thereof back upon itself at its inner periphery to form at the front face of said flange and at the inner periphery thereof an annular channel; and an annular sealing member joined to the outer face of said sheet metal member at said flange thereof, extending into said channel, and extending from said flange along the outer surface of said sheet metal member toward but not up to the free end of said cylindrical portion of said sheet metal member distant from said flange to leave at said latter end of said sheet metal member a free cylindrical portion which may be bent inwardly for attaching said sheet metal member and said sealing member therewith to the piston.

4. A device for providing a slidable sealed engagement between a piston and a cylinder, comprising, in combination, a sheet metal member having an annular cylindrical portion and at one end of said cylindrical portion an inwardly directed annular flange, said sheet metal member being adapted to be placed on a piston with the inner face of said flange engaging the front face of the piston and with the inner face of said cylindrical portion adapted to engage the outer cylindrical face of the piston; and an annular sealing member joined to the outer face of said sheet metal member at said flange thereof and extending from said flange along the outer surface of said sheet metal member toward but not up to the free end of said cylindrical portion of said sheet metal member to leave at said latter end of said sheet metal member a free cylindrical portion which may be bent inwardly for attaching said sheet metal member and said sealing member therewith to the piston, said annular sealing member having an inwardly directed annular portion covering said flange and extending radially inwardly beyond said flange.

5. A device for providing a slidable sealed engagement between a piston and a cylinder, comprising, in combination, a sheet metal member having an annular cylindrical portion and at one end of said cylindrical portion an inwardly directed annular flange, said sheet metal member being adapted to be placed on a piston with the inner face of said flange engaging the front face of the piston and with the inner face of said cylindrical portion adapted to engage the outer cylindrical face of the piston; and an annular sealing member joined to the outer face of said sheet metal member at said flange thereof and extending from said flange along the outer surface of said sheet metal member toward but not up to the free end of said cylindrical portion of said sheet metal member to leave at said latter end of said sheet metal member a free cylindrical portion which may be bent inwardly for attaching said sheet metal member and said sealing member therewith to the piston, said annular sealing member having a free annular skirt portion extending forwardly and flaring outwardly from said flange of said sheet metal member and forming with the portion of said sealing member extending along the outer surface of said cylindrical portion of said sheet metal member an annular shoulder extending about the exterior of said sealing member.

6. A device for providing a slidable sealed engagement between a piston and a cylinder, comprising, in combination, a sheet metal member having an annular cylindrical portion and at one end of said cylindrical portion an inwardly directed annular flange, said sheet metal member being adapted to be placed on a piston with the inner face of said flange engaging the front face of the piston and with the inner face of said cylindrical portion adapted to engage the outer cylindrical face of the piston; and an annular sealing member joined to the outer face of said sheet metal member at said flange thereof and extending from said flange along the outer surface of said sheet metal member toward but not up to the free end of said cylindrical portion of said sheet metal member to leave at said latter end of said sheet metal member a free cylindrical portion which may be bent inwardly for attaching said sheet metal member and said sealing member therewith to the piston, said annular sealing member having a free annular skirt portion extending forwardly and flaring outwardly from said flange of said sheet metal member and forming with the portion of said sealing member extending along the outer surface of said cylindrical portion of said sheet metal member an annular shoulder extending about the exterior of said sealing member, said shoulder being conical and located opposite the intersection between said flange and cylindrical portion of said sheet metal member.

7. A device for providing a slidable sealed engagement between a piston and a cylinder, comprising, in combination, a sheet metal member having an annular cylindrical portion and at one end of said cylindrical portion an inwardly directed annular flange, said sheet metal member being adapted to be placed on a piston with the inner face of said flange engaging the front face of the piston and with the inner face of said cylindrical portion adapted to engage the outer cylindrical face of the piston; and an annular sealing member joined to the outer face of said sheet metal member at said flange thereof and extending from said flange along the outer surface of said sheet metal member toward but not up to the free end of said cylindrical portion of said sheet metal member to leave at said latter end of said sheet metal member a free cylindrical portion which may be bent inwardly for attaching said sheet metal member and said sealing member therewith to the piston, said sealing member terminating at the portion thereof extending along said cylindrical portion of said sheet metal member in a sharp annular edge and having a conical end face extending inwardly from said edge toward said sheet metal member.

8. A device for providing a seal between two concentric and cylindrical members one of which is having a front face and which are in moving relationship to each other, comprising, in combination, a sheet metal member have an annular cylindrical portion and at one end thereof a radial directed portion, said sheet metal member being adapted to be placed on the member having the front face, with the inner face of said radial portion engaging the front face of this member and said cylindrical portion engaging with one of its faces the cylindrical face of this member; and an annular sealing member joined to the outer face of said sheet metal member at said radial portion thereof and extending from said radial portion along the other face of said cylindrical portion of said sheet metal member toward but not up to the free end of said cylindrical portion of said sheet metal member to leave at said latter end of said sheet metal member a free end portion which may be bent inwardly for attaching said sheet metal member and said sealing member therewith to this member.

References Cited in the file of this patent

UNITED STATES PATENTS

| | | |
|---|---|---|
| 1,531,234 | Davis | Mar. 24, 1925 |
| 1,859,436 | Durdin | May 24, 1932 |
| 2,181,028 | Sinclair | Nov. 21, 1939 |
| 2,516,811 | Thomas | July 25, 1950 |
| 2,687,335 | Bowerman | Aug. 24, 1954 |

FOREIGN PATENTS

| | | |
|---|---|---|
| 444,268 | Great Britain | Mar. 18, 1936 |